Jan. 14, 1930.   H. A. MUNDORFF, JR   1,743,375
MOLD FOR FROZEN CARBONATED CONFECTIONS
Filed Aug. 27, 1929
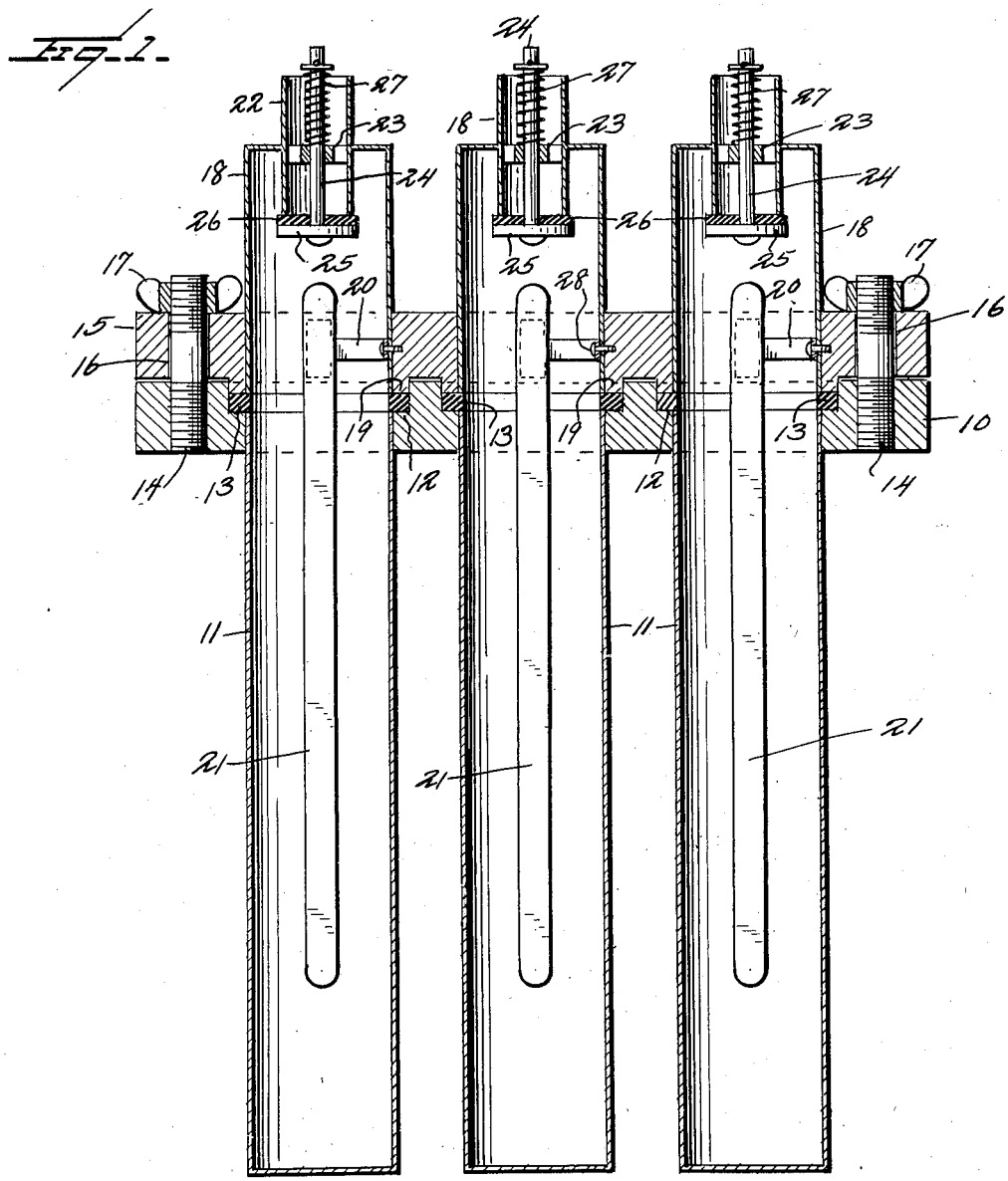
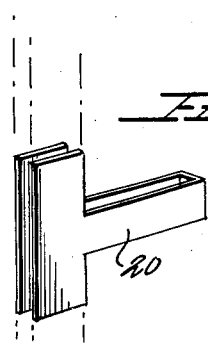
Inventor
H. A. Mundorff, Jr.
By Frederick S. Stitt
Attorney Patented Jan. 14, 1930

1,743,375

UNITED STATES PATENT OFFICE

HARRY A. MUNDORFF, JR., OF WILMINGTON, DELAWARE

MOLD FOR FROZEN CARBONATED CONFECTIONS

Application filed August 27, 1929. Serial No. 388,773.

This invention relates to means for making frozen confections and particularly to means for freezing carbonated liquids such, for instance, as ginger ale, or any other carbonated liquid, on sticks so that the stick may be used as a handle for eating the frozen confection.

It has heretofore been proposed to freeze a confection on a stick, but my invention provides for the freezing of a carbonated liquid upon a stick and inasmuch as the liquid contains carbonic acid gas, one of the objects of the present invention is to provide means of this character which will hold the carbonic acid gas within the liquid and prevent its escape in the form of bubbles from the liquid.

A further object is to provide means for this purpose including a mold, a cap adapted to close over the mold and have gas-tight engagement therewith, a valve in the cap whereby the carbonated liquid may be forced into the cap and so into the mold of the receptacle, and means for clamping the cap in air-tight engagement with the mold.

A further object is to provide a mechanism of this character which may be arranged to permit the freezing of a plurality of confections simultaneously.

Other objects will appear in the course of the following description.

My invention is illustrated in the accompanying drawings, wherein:—

Figure 1 is a vertical sectional view through a mold constructed in accordance with my invention;

Figure 2 is a perspective view of the rod clamping means detached.

Referring to these drawings, 10 designates a plate which may be of brass and have any desired length and width, the width depending upon the size of the molds carried by this brass plate and the length upon the molds so carried. Each brass plate is formed with a plurality of openings depending from which are the copper-tubes or receptacles 11 within which the liquid to be frozen is disposed. These receptacles are, of course, open at the top, but closed at the bottom. Immediately around the opening for the receptacle in the plate 10, the plate is formed with a countersink at 12 wherein is disposed a gasket 13 of rubber or other suitable material. The brass plate 10 at its ends or at any desired points is provided with the upwardly extending stud bolts 14.

Coacting with the plate 10 is a confronting plate 15 likewise preferably made of brass, though I do not wish to be limited to this, having holes 16 at its ends through which the stud bolts 14 pass, the stud bolts being provided with thumb nuts. These thumb nuts 17 engage the stud bolts so as to hold the plate 15 down against the plate 10.

Mounted within the plate 10 are a plurality of heads or caps 18, there being a cap or head for each of the receptacles 11. The lower end of each cap or head is flanged at 19 to fit within the countersunk opening 12 and bear against the gasket 13. Within each head adjacent the lower end thereof is a spring clip designated 20 having opposed resilient jaws which is adapted to carry a preferably wooden rod or stick 21 and support this stick in the receptacle in centered relation thereto with the upper end of the stick projecting above the mouth of the receptacle 11. Each cap 18 at its upper end carried a filling tube 22 which extends down into the head and extends upward above the head. Disposed within the tube is a valve stem guide or spider 23 through which the valve stem 24 passes. This stem, at its lower end, has the head 25 and above this head the gasket 26 or washer which fits against the lower end of the tube 22. When this valve stem is depressed, liquid can pass through the spider 23 and out of the lower end of the tube 22 and into the receptacle 11. When the receptacle 11 is filled to the proper extent, the valve formed by the parts 25 and 26 is allowed to close under the action of the spring 27 which surrounds the valve stem.

It will be seen that the mold receptacles 11 are entirely closed so as to retain the carbonic acid gas within the liquid until the liquid has been frozen by means of any suitable refrigeration. After the molds have been filled with liquid, the molds are inserted in suitable refrigerating medium until the liquid therein is frozen and after the liquid is frozen, the upper plate 15 is removed from the lower plate.

The molds will then be dipped into warm water which will permit the removal of the finished product. The finished products are then lifted out of the several mold receptacles 11 by means of the sticks 21. It will be understood, of course, that the molds may be dipped into warm water before the plate 15 is removed from its engagement with the plate 10 if desired. The spring clamps 20 are U-shaped as shown in Figure 2 and have sufficient tension to keep the clamping means constantly closed. These spring clamps keep the stick in position until the carbonated liquid has been converted to a frozen solid. These spring clamps slip over and release their hold upon the stick when the upper section is being removed because of the fact that the carbonated liquid and stick is frozen solid and clings to the molds or receptacles 11. The clamps are fastened on the inside of the filling caps 18 by means of screws 28. It will be understood that by the term "sticks" I refer to wooden sticks or sticks of other material. These sticks are preferably flatsided but may have any other cross-sectional form.

It will be seen that my structure may have any desired length and thus act to support and fill any number of tubes 11 and that these tubes may be frozen as a unit and removed from the refrigerating medium as a unit and dipped into warm water as a unit. The device is very simple and has been found particularly effective. Where a carbonated liquid is to be frozen, unless provision is made for preventing the escape of carbonic acid gas, it is impossible to freeze this liquid without it becoming vapid and lifeless and losing the life given to it by the included carbonic acid gas.

Obviously may be modifications might be made without departing from the spirit of the invention as defined in the appended claims.

I claim:—

1. A device for freezing carbonated confections including a plate having a freezing receptacle extending therefrom, a second plate adapted to be held against the first-named plate and having a cap formed to have air-tight engagement with the first named plate and with the receptacle, means within the cap for supporting and centering a stick within the freezing receptacle, and a valve permitting the introduction of carbonated liquid into said cap but closable against the escape of gas therefrom.

2. In a device of the character described, a freezing receptacle acting as a mold, a cap adapted to be brought into air-tight engagement with the freezing receptacle, and having means within the cap for supporting and centering a stick within the freezing receptacle, the cap having means permitting the inlet of liquid into the receptacle, but preventing the outlet of gas therefrom.

3. A device of the character described, comprising a plate, a plurality of freezing receptacles constituting molds and depending from the plate, a confronting plate, means for forcing said plates into engagement with each other, the confronting plate having a plurality of caps, equal in number to the freezing receptacles, the first named plate having countersunk openings around the openings of the freezing receptacle and provided with a gasket and each cap having air-tight engagement with the corresponding gasket, and means disposed within each cap for supporting and centering a stick within the freezing receptacle, and means permitting the introduction of liquid into the cap but preventing the the escape of gas therefrom.

4. A device of the character described comprising a plate, a plurality of freezing receptacles constituting molds and depending from the plate, a confronting plate, means for forcing said plates into engagement with each other, the confronting plate having a plurality of caps, equal in number to the freezing receptacles, the first named plate having countersunk openings around the openings to the freezing receptacle and provided with a gasket and each cap having air-tight engagement with the corresponding gasket, a clamp disposed within each cap and adapted to detachably engage with and center a stick within the freezing receptacle, and means for introducing liquid into the cap but preventing the escape of gas therefrom.

5. A device of the character described comprising a plate, a plurality of freezing receptacles constituting molds and depending from the plate, a confronting plate, means for forcing said plates into engagement with each other, the confronting plate having a plurality of caps, equal in number to the freezing receptacles, the first named plate having countersunk openings around the openings to the receptacle and provided with a gasket and each cap having air-tight engagement with the corresponding gasket, means disposed within each cap for supporting and centering a stick within the freezing receptacle, and a valve disposed in the upper end of the cap and opening downward to permit the introduction of liquid into the cap and conjoined receptacle but resiliently closed to prevent escape of gas from the cap and receptacle.

6. A device of the character described comprising a support for a freezing receptacle, the receptacle depending from the support, a cap adapted to be disposed against said support and having gas-tight contact therewith, means for clamping the cap against the support, means disposed within the cap for detachably engaging a stick and centering it within the freezing receptacle, a valve tube entering the top of the cap and having a spider, a valve stem extending through the spider and having a valve bearing against the lower end of the valve tube, and a spring urging the valve stem upward.

7. In a device of the character described, a supporting member, a freezing receptacle depending therefrom, a cap adapted to have airtight engagement with said member in alinement with the freezing receptacle, means for clamping the cap against said member, means for introducing liquid into the top of the cap but preventing the escape of gas therefrom, and means for supporting a stick within the freezing receptacle and centering it therein comprising a relatively U-shaped resilient clamp mounted upon the wall of the cap, the free end portions of the clamp being adapted to engage the stick.

In testimony whereof I affix my signature.

HARRY A. MUNDORFF, Jr.